US012754898B1

(12) United States Patent
Hadley

(10) Patent No.: US 12,754,898 B1
(45) Date of Patent: Oct. 6, 2026

(54) AUTOMATED ADDRESS GEOCODING

(71) Applicant: THE HUNTINGTON NATIONAL BANK, Columbus, OH (US)

(72) Inventor: Eric C Hadley, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/401,139

(22) Filed: Nov. 25, 2025

(51) Int. Cl.
*G06F 16/00* (2019.01)
*G06F 16/22* (2019.01)
*G06F 16/242* (2019.01)

(52) U.S. Cl.
CPC ...... *G06F 16/2282* (2019.01); *G06F 16/2425* (2019.01); *G06F 16/2428* (2019.01)

(58) Field of Classification Search
CPC ............. G06F 16/2282; G06F 16/2425; G06F 16/2428
See application file for complete search history.

(56) References Cited

U.S. PATENT DOCUMENTS

2019/0311057 A1* 10/2019 Sung ................. G06F 16/24542
2021/0334275 A1* 10/2021 Smart ................. G06F 16/2456
2022/0245044 A1* 8/2022 Mabry ................... G06N 5/025
2025/0328728 A1* 10/2025 Goldstein ............... G06F 40/20

* cited by examiner

*Primary Examiner* — Paul Kim
(74) *Attorney, Agent, or Firm* — Kilpatrick Townsend & Stockton LLP

(57) ABSTRACT

The techniques can include accessing a graphical user interface that includes a first interactive field for receiving text and/or a second field for displaying text that is retrieved from the external system. The techniques may include iteratively: retrieving first information for a respective entity from a tabular data file using an index; providing the first information for the respective entity to the first interactive field of the graphical user interface; instructing the external system to retrieve second information for the respective entity in response to the first information; detecting the second information in the second field of the graphical user interface; adding the second information to the row in the tabular data file; detecting the data type for the second information; comparing the data type against the target data type; and/or determining whether to update the index for a subsequent iteration.

20 Claims, 6 Drawing Sheets

| | Address | City | State | Zip | Census Tract |
|---|---|---|---|---|---|
| 1 | 22 Smith Ave. | New Smyrna | Texas | 22450 | 6541.90 |
| 2 | 1326 George St. | Tallapoosa | Colorado | 33520 | 7124.26 |
| 3 | 223 1st St. | Okeechobee | Alaska | 04414 | 1704.00 |
| 4 | 1 Park Way | Paris | California | 50229 | 2975.00 |
| 5 | 304 College St. | Warsaw | California | 11112 | 478.11 |
| 6 | 855 New St. | French | Alabama | 69775 | 5560.50 |
| 7 | 404 Byron Blvd. | Tuscaloosa | Illinois | 77444 | |
| 8 | 820 Street Ave. | Berne | Indiana | 12911 | |
| 9 | 500 Decatur St. | Parish | Louisiana | 37111 | |

AUTOMATED ADDRESS GEOCODING

BACKGROUND

Communication and data exchange between computer systems can be challenging. Some computer systems are not configured for programmatic access by other devices, and, for example, a computer system may only provide data to on a graphical user interface that is intended for human operators. The computer system may be a legacy system that does not provide application programming interfaces (APIs), or other machine-readable endpoints, to other computer systems. Data may need to be extracted from the interface to access data from the computer system. However, extracting data from an external service's graphical user interface can be error prone.

BRIEF SUMMARY

The techniques can include a method for database management. The techniques can include accessing a graphical user interface that includes a first interactive field for receiving text and/or a second field for displaying text that is retrieved from a database of the external system. The techniques may include iteratively: retrieving first information from a tabular data file using an index that identifies a row in the tabular data file for a respective entity of the set of entities; providing the first information for the respective entity to the first interactive field of the graphical user interface; instructing the external system to retrieve second information for the respective entity in response to the first information; detecting the second information in the second field of the graphical user interface; adding the second information to the row in the tabular data file; detecting the data type for the second information; comparing the data type against the target data type; and/or determining whether to update the index for a subsequent iteration.

Implementations of these techniques can include corresponding methods, computer systems, apparatus, and computer programs recorded on one or more transitory or non-transitory computer storage devices (e.g., computer readable media), each configured to perform the actions of the techniques.

BRIEF DESCRIPTION OF THE DRAWINGS

Various embodiments in accordance with the present disclosure will be described with reference to the drawings, in which.

DETAILED DESCRIPTION

Figure 1:
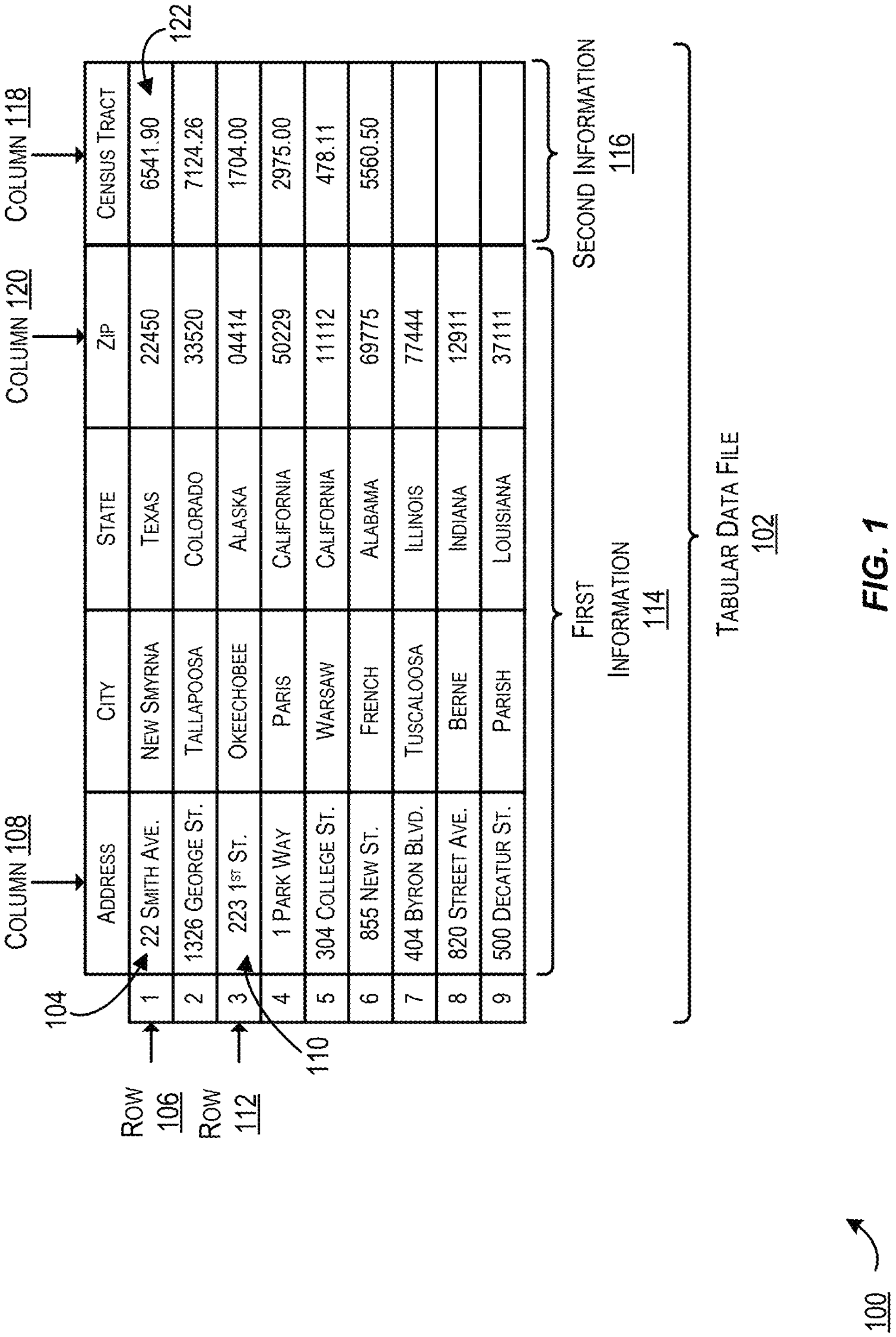
FIG. 1 is a simplified diagram of a tabular data file, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An external system can be used for data transformations. For example, a computer system can provide data to the external system in a first format, and the external system can return transformed data in a second format. An external system may provide useful functionality, but communication with these systems is often difficult. External systems, particular governmental or legacy systems, may use outdated interfaces that are not configured for access by another computing system. For example, an external system may not provide an application programming interface (API) that is configured for communication with other computer systems. Instead, the external system may only allow communication through a graphical user interface (GUI) that is designed for human users.

An external system's graphical user interface can be used for automated data transformations. The data for a transformation can be stored in a tabular data file. A computer system can provide the data for a transformation to an external system's graphical user interface, and the external system can update the interface to show the transformed data. The computer system can extract the transformed data from the interface and add the data to the tabular data file. The computer system can validate the transformed data, and the system may attempt to transform the same instance of data multiple times if the transformed data is not validated.

In an illustrative example, a researcher is using census data to study changes to real estate prices in Ohio. The researcher has designated a first group of the Ohio census tracts as a treatment group and a second group of census tracts as a control group. The researcher has access to 100,000 Ohio real estate transactions, but the transactions only list a mailing address for each transferred property. To complete the project, the researcher needs to transform mailing addresses into census tract numbers so that the transactions can be sorted into the treatment and control groups.

The researcher decides to use a census website to transform the mailing address data into census tract data. The census website does not provide any application programming interfaces and instead the website receives data via a graphical user interface. The graphical user interface includes a search bar (e.g., a first field) for receiving an input address. After receiving an address, the census website can present a corresponding census tract number in a second field of the graphical user interface.

The researcher provisions a computing system to transform the addresses via the graphical user interface. The census website does not provide an application programming interface so the researcher must use the external graphical user interface to transform the data. To provision the computing system, the researcher adds the mailing addresses to a tabular data file. Each row in the tabular data file corresponds to a transaction and the addresses are added to a first block of cells in each row. The researcher provides the tabular data file and an address for the census website to the computer system (e.g., via a graphical user interface on the computer system). The researcher also identifies the first block of cells that include the mailing addresses and a second block of cells for receiving the transformed data from the census. The researcher then instructs the computer system to transform the data from the tabular data file.

To transform the mailing addresses, the computer system provides mailing addresses from the tabular data file to the first field of the census website. The computer system instructs the website to retrieve a census tract for the address by simulating input to the website's interface. In response to the instruction, the website presents the retrieved census tract data as a key-value pair on the interface's second field. The computer system simulates input to the interface (e.g., double clicks) until the system selects the key "Tract No." and the key can be used to determine a corresponding value. The value is returned to the tabular data file, and after validation, the computer system selects a new entity from the file. The computer system iteratively performs these operations until the data in the tabular data file is transformed. The researcher then uses the transformed data to sort the transactions into treatment and control groups.

The techniques provide an improvement to the technical field of data processing. A tabular data file can support simultaneous access by multiple processes. For example, any number of read operations and write operations can be performed simultaneously, and simultaneous access can simplify scheduling these operations. Simultaneous access to the tabular data file can increase the amount of data that is retrieved from an external system because the external system can be accessed multiple times in parallel. The techniques can use key-value pairs to locate transformed data in a graphical user interface (e.g., adaptive screen scraping). Pixel coordinates may vary between display devices and the coordinates for the transformed data may vary between devices. Using a key to locate a value in the graphical user interface can allow a computer system to locate the transformed data across a variety of different computing devices with different displays. These techniques can also adapt to different graphical user interfaces across different external systems. The techniques include steps to validate an instance of data before attempting to transform another data instance. The validation steps can increase the accuracy of the retrieved data. The proposed techniques can also save power by enabling data to be extracted from an external system's interface while a display is powered off or in a low power mode. For example, the graphical user interface can be emulated and the data transformation can occur without actually displaying the interface on the display. These techniques provide an improvement by drastically reducing the number of human interaction steps (e.g., click reduction) in a user interface (e.g., from 20+ manual steps per address to 0 or 1 automated steps). Reduced human interactions can improve the quality of the transformed data by reducing user errors and making the process more efficient and accurate than a human could be.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 1 is a simplified diagram 100 of a tabular data file 102, in accordance with at least one embodiment. The tabular data file 102 is shown with a fixed number of cells, but a tabular data file can include any number of cells. A tabular data file 102 can be a computer executable file where data is organized into rows and columns. Data within the tabular data file 102 can be recorded in a cell. Each cell can be uniquely identifiable by a combination of a row and column. For example, cell 104 is in both row 106 and column 108, and cell 110 is in row 112 and column 108.

The tabular data file 102 can include first information 114 and second information 116. Each of the first information 114 and the second information 116 can be defined as one or more columns in the tabular data file 102. For example, the second information 116 can be the information in column 118, and the first information 114 can be the information in a contiguous group of columns (e.g., a block) from column 108 to column 120 (e.g., Address, City, State, and Zip). The first information 114 and the second information 116 can correspond to the same number of columns or different numbers of columns in various embodiments.

A row in the tabular data file 102 can include data for a single entity. For example, row 106 can refer to an entity (e.g., an individual person or company with legal rights and obligations) that is associated with the address: 22 Smith Ave., New Smyrna, Texas 22450. The first information from a single column can be an instance of first information, and the second information from a single column can be an instance of second information. Information that identifies one or more cells in the tabular data file 102 can be an index that identifies information (e.g., first information and/or second information) for a particular entity. The information that identifies one or more cells can include a row, a row and column, and/or a row and a range of contiguous columns.

The tabular data file 102 can be used to transform an instance of first information into an instance of second information. A data transformation system (e.g., DTS 202 from FIG. 2) can request the instance of second information from an external service by using the instance of first information. For example, the data transformation system can use an index to retrieve the instance of first information from the tabular data file 102. After retrieving the information, the data transformation system can provide the first information to the external service via an application (e.g., via a web browser application). The external service can retrieve an instance of second information that corresponds to the request, and the external service may present the corresponding second information on the application's graphical user interface. The data transformation service may provide some or all of the first information to the external service. For example, the data transformation system may exclude data from one or more cells in the first information's block, before providing the instance of first information to the external service.

Information can be added to the tabular data file 102. For example, the data transformation system can add a retrieved instance of second information to the tabular data file 102. For example, the data transformation system can use the instance of first information from row 106 to retrieve census track information, and this instance of second information can be added to cell 122. The second information 116 may be cleaned, corrected, and/or concatenated (e.g., processed) by the data transformation system.

Figure 2:
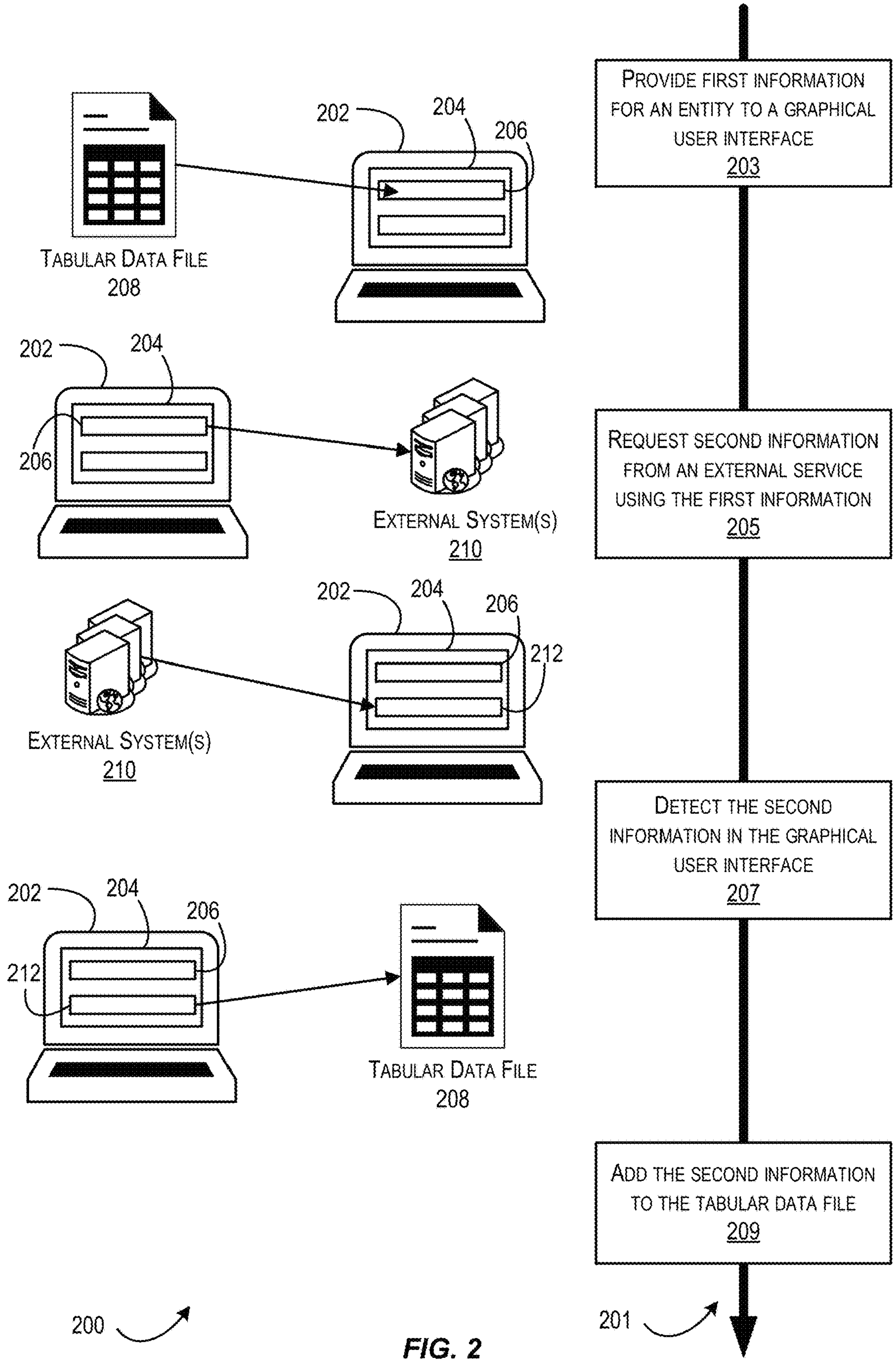
FIG. 2 is a simplified diagram and example flow for automated data transformations, in accordance with at least one embodiment.

FIG. 2 is a simplified diagram 200 and example flow 201 for automated data transformations, in accordance with at least one embodiment. The operations discussed in connection with FIG. 2 may be performed with a data transformation system (DTS) 202. In some embodiments, DTS 202 may be implemented by one or more computer(s), as a service, within an application, or the like. The operations discussed in connection with FIG. 2 may be performed in any suitable order. More or fewer operations than those depicted in FIG. 2 may be employed without diverting from this disclosure.

The flow 201 may begin at 203, where a DTS 202 provides information for an entity to a graphical user interface 204. The DTS 202 may provide the first information to a first field 206 of the graphical user interface 204, in an automated process. The first information may be provided from a tabular data file 208 to the to the first field 206 of the graphical user interface 204. For example, the tabular data file 208 and/or the graphical user interface may be executing on the DTS 202. In some embodiments, multiple graphical user interfaces 204 may execute on the DTS 202, and two or more instances of first information may be provided in parallel to two or more instances of the graphical user interface 204.

At 205, second information can be requested using the first information. To request the second information, the DTS 202 may provide the first information from the first field 206 to any number of external system(s) 210. The graphical user interface 204 can be an interface that is provided by an external system 210. For example, the graphical user interface 204 can be an interface that is provided to the DTS 202 via a web browser application, and the graphical user interface 204 can be provided in response to the DTS accessing a web page that is hosted by the external system 210. Any number of instances of second information can be requested in parallel, and, in some embodiments, the operations of 203 and 205 can be performed in parallel for separate sets of first information and second information.

At 207, the second information can be detected. The DTS 202 can detect the second information in a second field 212 of the graphical user interface 204. An external system 210 can cause the second field 212 of the graphical user interface 204 to display the second information. For example, the external system(s) 210 can provide the second information to the DTS 202 in response to receiving the request at 205. The second information may be provided with instructions (e.g., computer executable instructions) that cause the DTS 202 to display the second information in the second field 212. The graphical user interface 204 may display the first field 206 and the second field 212 simultaneously.

At 209, the DTS 202 can add the second information to the tabular data file 208. The DTS may validate the second information before the information is added to the tabular data file 208. For example, the tabular data file 208 can include cells that are defined by a row and a column. A row in the tabular data file 208 can correspond to an entity, and the first information for an entity can be retrieved from one or more first cells in the row, and the second information can be returned to one or more second cells in the row.

Each cell may have characteristics (e.g., a data type and a data length), and the DTS 202 may use the characteristics of the one or more second cells to validate the second information. For example, the DTS 202 can validate the second information by comparing the characteristics of the retrieved second information against expected characteristics for the second information (e.g., data type and data length from the one or more second cells). The second information can be valid if the characteristics match (e.g., the data types are identical). If the second information is not valid, the DTS 202 may repeat 203-109 using the same first information for the entity until the second information is validated. If the second information is validated, the DTS 202 may obtain first information for a new entity and perform operations 203-109 to obtain second information for the new entity.

Figure 3:
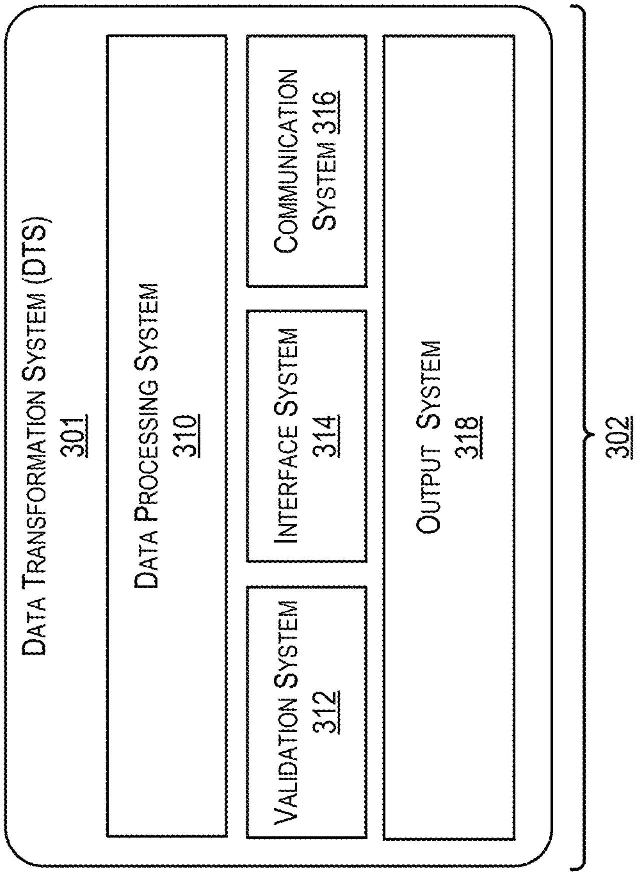
FIG. 3 is a simplified diagram illustrating an example data transformation system (DTS), in accordance with at least one embodiment.

FIG. 3 is a simplified diagram 300 of a data transformation system (DTS) 301. The DTS 301 (an example of DTS 202) may support processes, methods, operations, and techniques discussed in connection with the FIGS. 2-2 and 4-6 and execute as a separate system or as part of the computer(s) 410 of FIG. 4. System(s) 302 may be systems and/or sub-systems. While the system(s) 302 are depicted with a particular structure, it is not to be considered limiting and the system(s) 302 may be arranged with any suitable organizational and/or communication structure. The system(s) 302 of DTS 301 may be software systems, hardware systems, or a combination thereof. If the systems are software systems, the systems can be embodied on a computer readable medium and processed by a processor in any of the computer systems described herein. It should be noted that any system or data store described herein, may be, in some embodiments, be a service responsible for providing functionality corresponding to the system described below. The system(s) 302 may be executed as part of the DTS 301, or the system(s) 302 may exist as separate systems or services external to the DTS 301. In some embodiments, the system(s) 302 may be executed by the same or different computing devices, as a service, as an application, or the like. In some embodiments, any combination of any number of the system(s) 302 can be implemented as application programming interfaces.

In at least one embodiment, the DTS 301 can include a data processing system 310. The data processing system 310 can perform operations to retrieve data from data sources and/or add data to data sources. The data may be processed by the data processing system 310, and, for example, the system can clean, correct, delete, concatenate, and/or interpolate the data after retrieving the data from a sources or before adding the data to the source. A data source can include a file that is provided to the DTS 301. For example, the data source can include a tabular data file.

The data processing system 310 can retrieve data (e.g., one or more instances of first information) from a tabular data file. For example, the data processing system 310 can use an index to retrieve an instance of first information from a tabular data file. The index can be information that identifies a row in the tabular data file. The index may include a source comprising two or more columns in the tabular data file. The source's two columns can represent a start point and an end point for an instance of first information (e.g., the instance of first information can be the cells in the row from the cell identified by the first column and the cell identified by the last column).

Data can be added to the tabular data file by the data processing system 310. For example, the data processing system 310 can add an instance of second information to the tabular data file. The index may indicate a destination for the instance of second information. The destination may be information that identifies one or more cells in the tabular data file. The destination's two columns can represent a start point and an end point for an instance of second information (e.g., the instance of second information can be added to the cells in the row from the cell identified by the first column and the cell identified by the last column). The cells in the source and the cells in the destination can be different cells. In various embodiments, the number of cells in the source may be greater than the number of cells in the destination.

The data processing system 310 can simultaneously retrieve two or more instances of first data from a single tabular data file. In addition, or alternatively, two or more instances of second data can be simultaneously added to the tabular data file by the data processing system. In some embodiments, an instance of first information can be retrieved from a tabular data file and, simultaneously, an instance of second information can be added to the tabular data file.

The data processing system 310 can improve the operations of a computer system by allowing simultaneous access to the tabular data. Simultaneous access to a single file cannot be practically performed in the human mind, and allowing simultaneous access can prevent read-write conflicts. A read-write conflict can occur when a read operation and a write operation for the same data instance are both pending. In systems that perform read and write operations sequentially, the data that is retrieved by the read operation can be out of date if the read operation is performed before the write operation. Simultaneous access to the tabular data file can reduce read-write conflicts because the data in the tabular data file is more likely to be up to date.

In at least one embodiment, the DTS 301 can include a validation system 312. The validation system 312 can validate data that has been added to a tabular data file by the data processing system 310. An index can identify a row and the validation system 312 can validate one or more cells in the row. If the cells are valid, the validation system 312 can update the index so that the index points to a new entity. For example, the validation system 312 can increment a row value in the index so that the index identifies a new row that corresponds to the new entity. The validation system 312 can validate one or more of the cells in a row, and, for example, the validation system can validate the cells that correspond to an instance of second information.

The validation system 312 can use a data type to validate the data. Cells in a tabular data file can include a data type, and the validation system 312 can compare this expected data type (e.g., a target data type) against an observed data type for the data in the cells. For example, the cell can be configured for a date in the format mm/dd/yyyy, and the observed data in the cell can be text-based alphabetic characters. In this example, the validation system 312 can compare the expected data type (e.g., numerals) against the observed data type (e.g., alphabetic characters). The validation system 312 can determine that the data in the cell is not valid because the expected data type and the observed data type do not match. In response, the validation system 312 can instruct the data processing system 310 to retrieve the data again using the same index.

The validation system 312 can use a data length to validate the data. The data length may be used to validate data in addition to a data type or as an alternative to a data type. For example, a cell can be configured for a date in the format mm/dd/yyyy, and the expected data type can be Arabic numerals. The cell can contain a year in the format yyyy instead of a full date in the format mm/dd/yyyy. The validation system can determine that the observed data type matches the expected data type. However, the observed data length (e.g., four numerals) does not match the expected data length (e.g., eight numerals). Accordingly, the validation system 312 may determine that the cell's data is not validated, and the validation system 312 can instruct the data processing system 310 to request the cell's data a second time.

The validation system 312 may record the number of times that the data processing system 310 has requested data for a particular index. This number can be compared against a retry threshold, and the validation system 312 may perform various operations if the threshold is exceeded. For example, the validation system 312 may instruct the data processing system 310 to update the index to retrieve data for a new entity even though the retrieved data for the current entity is not validated. The validation system 312 may provide a notification to a user device after the threshold has been exceeded. In some embodiments, the validation system 312 can delete the data (e.g., an instance of second information) from the row. With or without deleting the data, the validation system 312 may add the row to a new tabular data file in some embodiments, and this new tabular data file may include the data that has not been validated during a particular batch of processing.

In at least one embodiment, the DTS 301 can include an interface system 314. The interface system 314 can generate and present an interface on a display device. The interface can be a graphical user interface (GUI), and the DTS 301 can receive information via the interface. For example, a tabular data file can be received as input to a field of the graphical user interface. The interface system 314 can receive information about the index via the graphical user interface. For example, the information about the index can include a start row, an end row, and a number of rows to increment the index between iterations. The information about the index can include information that identifies cells that include an instance of first information. For example, this information can include a start column and an end column that includes the first information. In addition, or alternatively, the information about the index can include information that identifies cells for the second information (e.g., the cells where the second information is to be added). For example, this information can include a start column and an end column for the second information. A data type and/or a data length for any number of the cells in a tabular data file can be received via the graphical user interface. A label can be received for any number of the columns in the tabular data file via the interface, and the labels can be used to obtain the second information (e.g., by matching the label to keys from key-value pairs). In some embodiments, the interface system 314 can receive a retry threshold via the graphical user interface.

The interface system 314 can retrieve data from an external system in response to instructions from the data processing system 310. The data from the external system may be accessed via a graphical user interface, and the interface may be displayed by an application (e.g., a web browser application). The interface system 314 can provide an instance of first information to a field of the external interface in response to instructions from the data processing system 310. After providing the instance to this first field, the interface system 314 can instruct the interface (e.g., via input to a graphical element) to retrieve information from the external system. The retrieved instance of second information can be displayed on a second field of the external interface.

The second information may be organized as key-value pairs. A key (e.g., a label) can be displayed in the second field alongside a corresponding value. The keys are consistent across different instances of second information, but the values can vary between instances. The interface system 314 can use a key to obtain the corresponding value. For example, the columns that are designated for the second information can be associated with labels, and an instance of second information can be retrieved by locating the keys in the second field that match the labels. After locating the key, the interface system 314 can use a vector originating from a centroid of the pixels that represent the key to obtaining the corresponding value. For example, the vector can be a two-dimensional vector that specifies a number of pixels in each axis. The dimension in pixels of this external interface may vary depending on a display device where the external interface is rendered (e.g., a display that is associated with the DTS 301).

The relative positions of the keys and values (e.g., a vector pointing from a centroid of the key to the centroid of a corresponding value) can be consistent, but the number of pixels that correspond to the offset can vary between display devices. To account for this variance, the interface system 314 may increment the number of pixels in the vector (e.g., in one or more dimensions) until the interface system selects a value. The interface system 314 can select a value after selecting a pixel. The pixel's characteristics may indicate that the pixel is part of a representation of a value, and the interface system 314 may use the characteristics to determine whether to select a pixel. For example, the pixel's color may indicate whether the pixel represents text from a value (e.g., a first color) or background (e.g., a second color). In this example, a first color pixel may be selected, and a second color pixel may not be selected. The interface system 314 can select a group of pixels around the elected pixel, and this group of pixels can be analyzed to determine if they represent a value. For example, optical character recognition techniques can be performed on the pixel to determine if the group of pixels includes text that represents a value. If the validation system 312 determines that the group of pixels represents a value, the system can validate this selected value as described above. If the selected value is not valid, the interface system 314 can change the direction of the vector and/or the magnitude of the increments for the vector until the correct value is selected or the retry timer is exceeded. If the selected value is valid, the interface system 314 may use the vector (e.g., the magnitude and/or direction in pixels) for subsequent retrievals. The interface system 314 may store a vector for each key value pair.

In at least one embodiment, DTS 301 can include a communication system 316 may include any suitable processing components (e.g., software, hardware, firmware, etc.) operable to support functions, operations, communications, etc. between one or more of systems 312, 314, 316, 318 and/or external systems (e.g., external system(s) 210 and/or external system(s) 440). The communication system 316 may function to transmit, receive, and/or otherwise communicate with the one or more systems or devices over one or more communication networks (e.g., the Internet, wide area networks "WAN", local area networks "LAN", an automated clearinghouse network, etc.). While not depicted, the data processing system 310, and/or any combination of the other systems 302, need not be physically local to the DTS 301, and may function, at least in part, as a component of a larger network (e.g., cloud network or similar). The communication system 316 may include any suitable number of supporting hardware components such as processor(s) (e.g., such as processor(s) 420 of FIG. 4), controller(s) (e.g., analog, digital, FPGA, etc.), server(s), non-transitory computer readable mediums such as memory such as RAM and/or ROM (e.g., memory 422 of FIG. 4).

The communication system 316 may communicate with multiple external systems to obtain the second information. For example, the communication system 316 may provide the first information to a first external service (e.g., via a first application programming interface (API). The first external service can transform an instance of first information into an input to a second external service. For example, the instance of first information can be a street address, and the input to the second external service can be coordinates (e.g., in longitude and latitude). The second external service can use this input to return the second information.

In at least one embodiment, the DTS 301 can include an output system 318. The output system 318 may include any suitable number of programs, algorithms, computer readable instructions, or similar to control, interact, provide feedback, provide alerts, provide notifications, and/or operations in response to one or more of the system(s) 302 performing operations. The output system 318 may include functionality to communicate with one or more user device(s) (e.g., via communication connections 430 of FIG. 4). The operation(s) may include aggregated information from system(s) 302. For example, the operation(s) may include transmitting a notification to one or more user device(s) in response to detecting that an instance of second information cannot be validated (e.g., after a threshold number of attempts to retrieve and validate the instance of second information for an entity). In some embodiments, the output system 318 is configured to perform one or more operations on the second information that has been obtained from the external service. The output system 318 can use the second information to generate reports, tune generative model(s), store tabular data files, generate graphs, generate executive summaries, display user friendly interfaces for interacting with data discussed within the scope of the present disclosure, or suitable equivalents.

Figure 4:
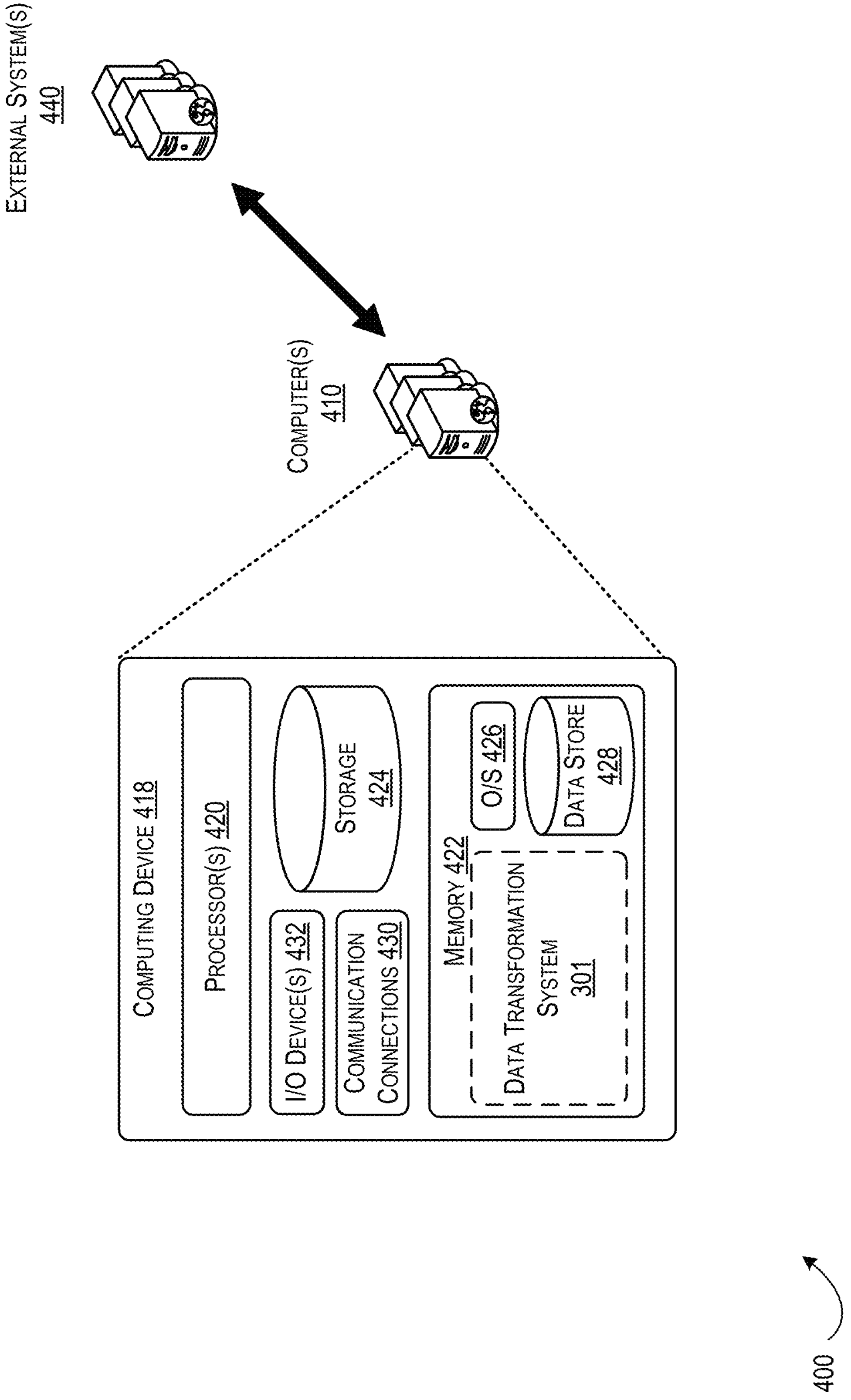
FIG. 4 is a simplified diagram illustrating an example system, in accordance with at least one embodiment.

FIG. 4 is a simplified diagram illustrating an example system 400, in accordance with at least one embodiment. The system 400 may be incorporated as a component and/or work in conjunction with devices, systems, and methods herein. Computer(s) 410 may be operated on behalf of an originator (e.g., a bank, financial institution, or another entity) that initially has access to a tabular data file (e.g., tabular data file 208 with respect to FIG. 2, and tabular data file 102 with respect to FIG. 1). The tabular data file may include any suitable number of variables, data instances values, data instance types, categories, subcategories, classifications, codes, identifiers, names, or combinations thereof.

The computer(s) 410 be an example of the computing device 418. In some embodiments, the computing device 418 and may include one or more processors (e.g., processor(s) 420). The processor(s) 420 may be implemented in hardware, computer-executable instructions, firmware, or combinations thereof. Computer-executable instruction or firmware implementations of the processor(s) 420 may include computer-executable or machine-executable instructions written in any suitable programming language. Computing device 418 may include memory 422. The memory 422 may store computer-executable instructions that are loadable and executable by the processor(s) 420, as well as data generated during the execution of these programs. The memory 422 may be volatile (such as RAM) and/or non-volatile (such as ROM, flash memory, etc.). The computing device 418 may include additional storage (e.g., storage 424), which may include removable storage and/or non-removable storage. Storage 424 may include, but is not limited to, magnetic storage, optical disks and/or tape storage. The disk drives and their associated computer-readable media may provide non-volatile storage of computer-readable instructions, data structures, program systems, and other data for the computing devices.

The memory 422 and/or storage 424 may be examples of computer-readable storage media. Computer-readable storage media may include volatile, or non-volatile, removable, or non-removable media implemented in any method or technology for storage of information such as computer-readable instructions, data structures, program systems, or other data. In some embodiments, memory 422 and the storage 424 are examples of computer storage media. Memory 422 and/or additional storage 424 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device 418. Computer-readable media may include computer-readable instructions, program systems, or other data transmitted within a data signal, such as a carrier wave, or other transmission. However, as used herein, computer-readable storage media does not include computer-readable communication media.

The memory 422 may include an operating system 426 and one or more data stores 628, and/or one or more application programs, systems, or services. The computing device may also contain communications connection(s) 430 that allow the computing device 418 to communicate with external service(s) 440, a stored database, another computing device, a server, user terminals and/or other devices (e.g., via one or more networks, not depicted). The computing device may also include I/O device(s) 432, such as a graphical user interface (GUI), keyboard, a mouse, a pen, a voice input device, a touch input device, a display, speakers, a printer, etc. In some embodiments, the memory 422 may store instructions that, when executed by processor(s) 420 implement the functionality described herein with respect to a data transformation system (DTS) (e.g., the DTS 202 with respect to FIG. 2). By way of example, computer(s) 410 may execute the instructions for DTS 301 to provide the functionality described above in connection with FIGS. 2-3, and 5-6. In some embodiments, the DTS 301 may execute on any suitable computer depicted in FIG. 4.

Figure 5:
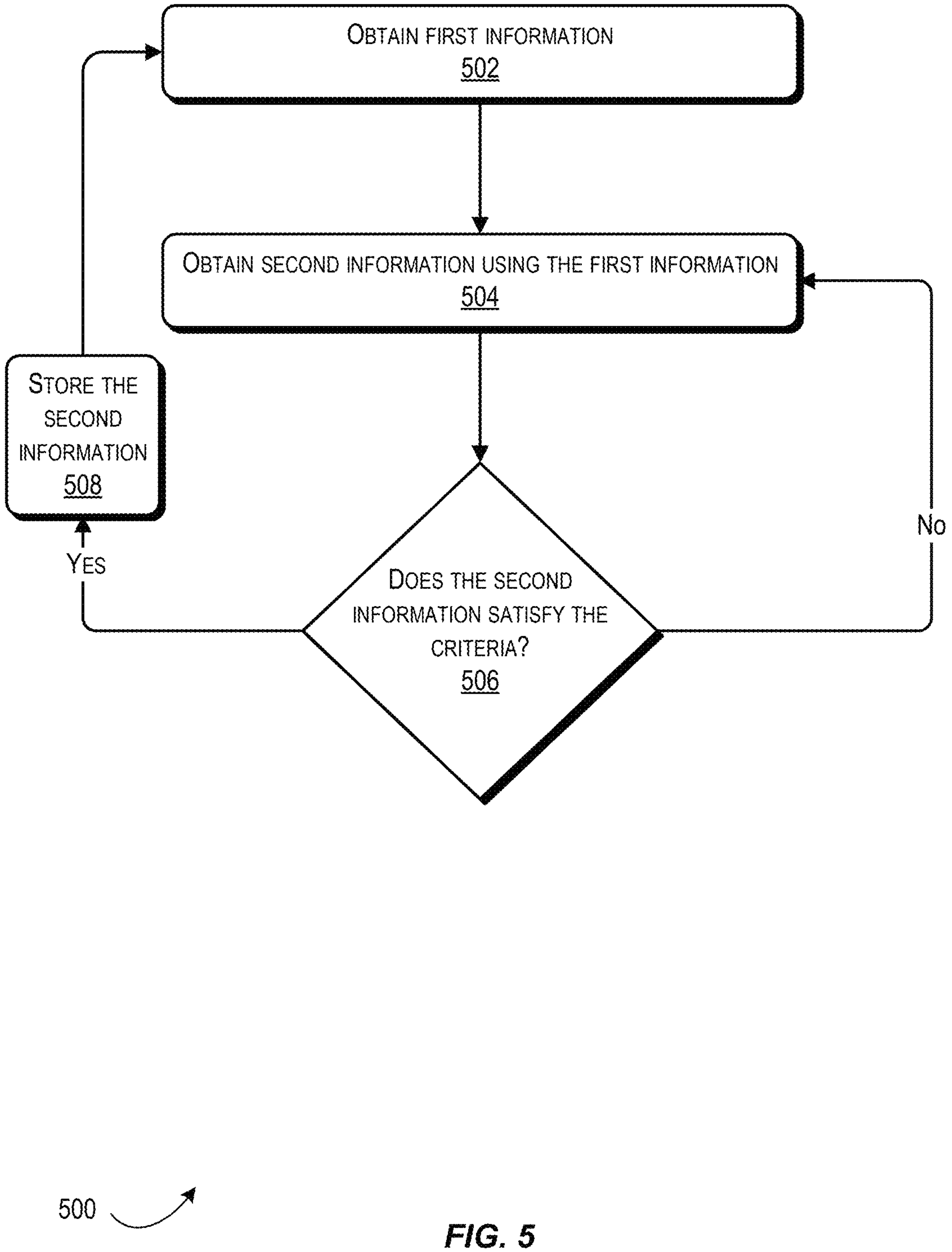
FIG. 5 is a block diagram illustrating an example method for validating information, according to at least one embodiment.

FIG. 5 is a block diagram illustrating an example method 500 for validating information, according to at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion of the data transformation system 301 of FIG. 3. In some embodiments, method 500 may be executed by components of computer(s) 410 and/or computing device 418, of FIG. 4.

At block 502, first information can be obtained. The first information can be an instance of first information that is obtained from a tabular data file such as the tabular data file 102. For example, a data transformation system (e.g., DTS 202 and/or DTS 301) can use an index to identify the cells in the tabular data file that include the instance of first information. The index can be information that identifies a sequence of cells that are located in a single row of the tabular data file.

The operations of method 500 can be performed in parallel. For example, two or more instances of first information can be obtained in parallel from a single tabular data file. The operations of block 502 can be performed concurrently with one or more of the operations of blocks 504-508. For example, the data transformation system can use a single tabular data file to simultaneously obtain an instance of first information for a first entity and store an instance of second information for a second entity. The human mind may not be able to perform these operations because the information for the two entities may be in different sections of the tabular data file, and a human may not be able to view both sections of the tabular data file at the same time.

At block 504, second information can be obtained using the first information. For example, an instance of first information can be used to obtain an instance of second information that represents the instance of first information. The data transformation system can provide the instance of first information to an external system (e.g., external system(s) 210 and/or external system(s) 440) via a first field of a graphical user interface. The external system may provide an instance of second information in response to the instance of first information.

The instance of first information may be processed by the data transformation system before the instance is provided to the external system. The processing can include correcting errors in the instance of first information, concatenating data from multiple cells in the instance of first information, and/or removing data from the instance of first information (e.g., excluding an apartment number from an address).

At block 506, whether the second information satisfies one or more criteria can be determined. For example, a user can provide an expected data type and an expected data length for instances of second information when providing the tabular data file. The user can provide the one or more criteria via the graphical user interface. For example, a user can identify columns of the tabular data file where the second information is to be returned (e.g., column 118). The columns can specify an expected data type, and the data transformation system can use information identifying the columns to retrieve the one or more criteria (e.g., the expected data type for each column). For example, the expected data type may be text, numbers and/or dates. The data transformation system may determine that an instance of second information does not satisfy the criteria if the data type for a column and the second information do not match (e.g., text was added to a date field). The user may provide the one or more criteria by specifying a data type and/or a data length for each column that corresponds to the second information.

The data transformation system may return to block 504 if the second information does not satisfy the one or more criteria. After returning to block 504, the data transformation system can attempt to obtain the second information again using the first information. If the second information satisfies one or more criteria, the data transformation system may obtain a new instance of first information and perform blocks 502-506 to obtain a new instance of second information. For example, the data transformation system can update the index so that first information for a new entity is retrieved at block 502. In some embodiments, the method 500 may proceed to block 502 (e.g., to obtain a new instance of second information) if the first instance of second information does not satisfy the one or more criteria a threshold number of times. The data transformation system may provide a notification to a user if the instance of second information does not satisfy the one or more criteria.

The data transformation system may proceed to block 508 if the second information satisfies the one or more criteria. At block 508, the second information can be stored. The data transformation system can store an instance of second information by adding the instance to the tabular data file. For example, an instance of first information can be obtained from a block of cells in a row of a tabular data file, and the instance of second information can be added to one or more cells in the same row of the tabular data file. The instance of second information can be obtained from a second field of the graphical user interface that was used to provide the instance of first information at block 504.

Figure 6:
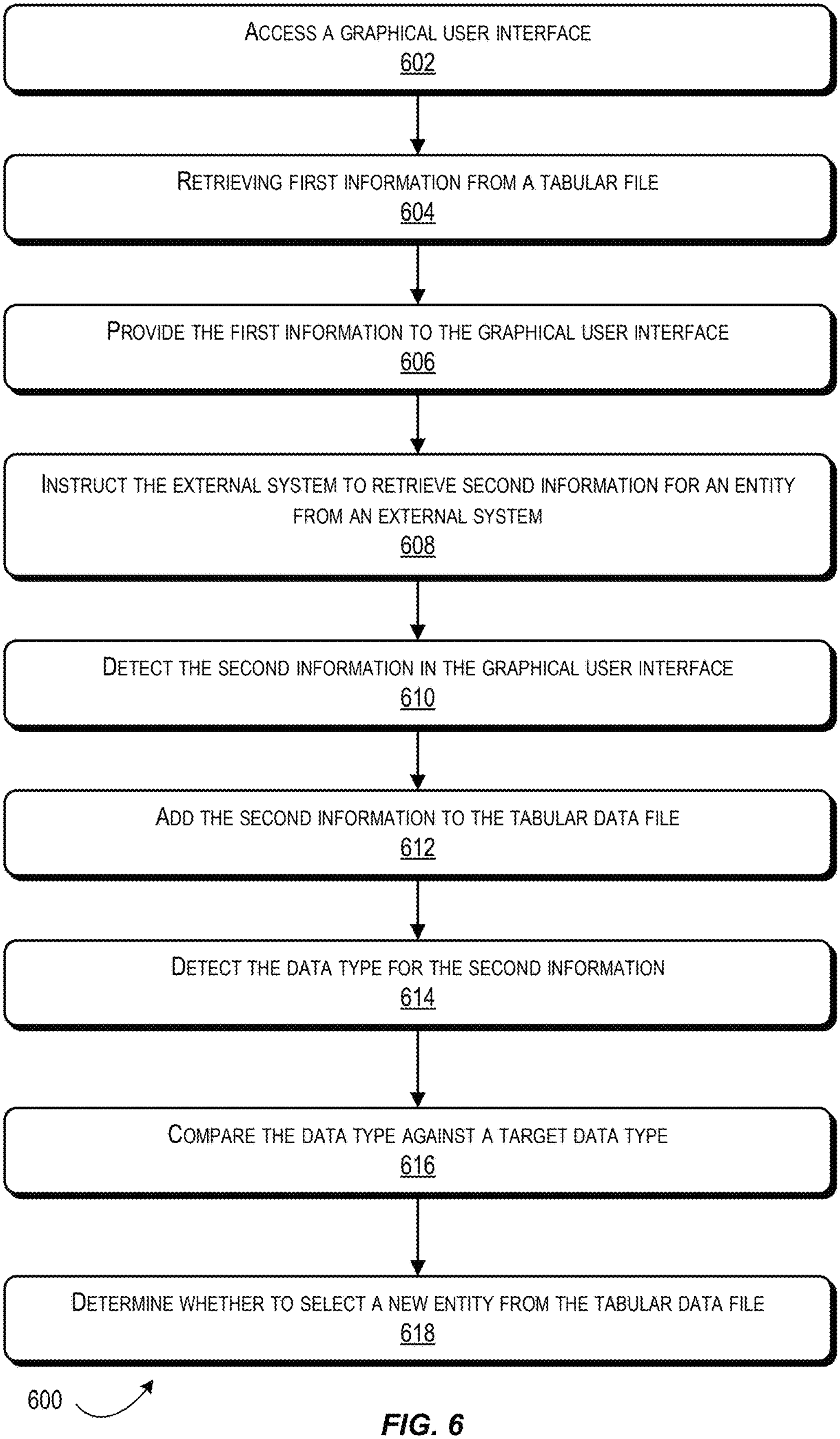
FIG. 6 is a block diagram illustrating an example method for automated data transformations, according to at least one embodiment.

FIG. 6 is a block diagram illustrating an example method 600 for automated data transformations, according to at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 5. The operations of method 600 may be performed by any suitable portion of the data transformation system 301 of FIG. 3. In some embodiments, method 600 may be executed by components of computer(s) 410 and/or computing device 418 of FIG. 4.

At block 602, a graphical user interface can be accessed. The graphical user interface can be accessed from an external system. The graphical user interface (e.g., the external interface) can include a first field for receiving text (e.g., an instance of first information) and a second field for displaying text (e.g., an instance of second information). The displayed text can be retrieved from a database of the external system. The graphical user interface can be accessed via an application such as a web browser application. The first field and the second field may be displayed concurrently in some embodiments. Communication with the external system can occur via an application programming interface. An application programming interface can be provisioned (e.g., by DTS 301) and communication with the external system can occur via the application programming interface.

The operations of block 604 to block 618 can be performed iteratively. The operations can be performed until one or more conditions are satisfied. For example, the operations of block 604 to 618 can be performed until a data type matches a target data type for a set of entities. In addition, or alternatively, the operations of block 604 to 618 may be performed for an entity until a data type matches the target data type or a threshold number of iterations have been performed using the first data for the entity.

At block 604, first information for an entity can be retrieved from a tabular file. The first information can be retrieved from a tabular data file using an index for the entity. The index can be information that identifies a row in the tabular data file, and each row in the tabular data file can correspond to a single entity. An entity may correspond to multiple rows in some embodiments. The index may include information that identifies one or more columns in addition to the row. The tabular data file can be accessed simultaneously by multiple computing devices. The operations of block 602 may be performed after the operations of block 604 and/or the operations of block 602 and 604 may be performed concurrently.

At block 606, the first information can be provided to the graphical user interface. The first information can be provided to a first field of the graphical user interface. The graphical user interface can be an external interface that is provided by an external system. In some embodiments, the first information may be transformed by a first external service before being provided to a second external service via the graphical user interface.

At block 608, the external system can be instructed to obtain the second information for the entity. The instruction can be provided by simulating input to the graphical user interface (e.g., a simulated click on an interactive element in the GUI). The second information can include key-value pairs.

At block 610, the second information can be detected in the graphical user interface. The second information may be detected in a second field of the graphical user interface. The second information may be displayed as values for key-value pairs, and the second information may be displayed alongside the keys. The second information can be obtained by using a key to locate a value. A first plurality of pixels that represent a key can be located in the second field of the graphical user interface. A vector that points from a centroid of the first plurality of pixels to can be used to locate a second plurality of pixels (e.g., the vector points to a centroid of the second plurality of pixels). The second plurality of pixels can be analyzed to determine if the second plurality of pixels includes a value that corresponds to the key. If the second plurality of pixels does not include the value, at least one of a magnitude of the vector and a direction of the vector can be updated to locate another plurality of pixels. This process can be performed iteratively until the value is located or a threshold number of iterations has been performed. The vector can be saved and used to locate key-value pairs for additional instances of first information.

At block 612, the second information can be added to the tabular data file. The second information can be added to the row of the tabular data file that contained the first information. Retrieving respective first information for a first entity and adding respective second information for a second entity can be performed simultaneously.

At block 614, a data type can be detected for the second information. The data type may be provided by the tabular data file (e.g., in metadata for a cell, column or row). For example, each column of the tabular data file may indicate a data type for the cells in the column, and the index may indicate one or more cells where the second information is to be added. The data type for the one or more cells can be the data type for the second information.

At block 616, the data type can be compared against a target data type. The target data type and/or a target data length can be received via a graphical user interface. The data length can be a number of characters that are expected for the second information. The data length can be compared against a data length threshold. The data length threshold can be received via the graphical user interface. The target data type and/or the data length threshold can be received via a third field of a graphical user interface. In some embodiments, the first interactive field, the second field, and the third interactive field are displayed simultaneously. For example, an external interface that includes the first field and the second field can be displayed alongside an interface that includes the third field.

At block 618, whether to select a new entity from the tabular data file can be determined. A new entity can be selected by updating the index, and the index may be updated if the second information is validated. A new entity may be selected even if the second information is not validated. For example, the new entity may be selected even if the data is not validated if a retry threshold is exceeded.

A system may be used to transform an address from a first format (e.g., first information) into a second format (e.g., second information). For example, an organization's reporting requirements may mean that each account needs to be associated with a census tract (e.g., second information). The accounts may be associated with account holder mailing addresses (e.g., first information). To transform the addresses to census tracts, an employee adds the first information to a tabular data file and provisions a data transformation system. Provisioning the data transformation system can include providing the file and a web address for a census website that can be used to look up census tract values. After provisioning the data transformation system, the employee allows his work computer to transform the first information into second information that is stored to the tabular data file.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from those described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for database management, the method comprising:

accessing, by a computing device and from an external system, a graphical user interface comprising at least a first interactive field for receiving text and a second field for displaying text that is retrieved from a database of the external system; and until a data type matches a target data type for a set of entities, iteratively performing:

retrieving, by the computing device, first information from a tabular data file using an index that identifies a row in the tabular data file for a respective entity of the set of entities, wherein each row in the tabular data file corresponds to a single entity of the set of entities;

providing, by the computing device, the first information for the respective entity to the first interactive field of the graphical user interface;

instructing, by the computing device, the external system to retrieve second information for the respective entity in response to the first information by simulating input to the graphical user interface;

detecting, by the computing device, the second information in the second field of the graphical user interface by:

locating, using a plurality of pixels of the graphical user interface, a key of a key-value pair in the second field, wherein the plurality of pixels represent the key; and determining a value of the key-value pair based on a location of the key, wherein at least a portion of the second information is displayed in the graphical user interface as the value;

adding, by the computing device, the second information to the row in the tabular data file;

detecting, by the computing device, the data type for the second information;

comparing, by the computing device, the data type against the target data type; and determining, by the computing device, whether to update the index for a subsequent iteration based at least in part on the comparing.

2. The method of claim 1, wherein retrieving respective first information for a first entity and adding respective second information for a second entity are performed simultaneously.

3. The method of claim 1, wherein a data length is identified for the second information.

4. The method of claim 3, further comprising:

comparing, by the computing device, the data length against a data length threshold.

5. The method of claim 4, wherein the graphical user interface further comprises a third interactive field for receiving the target data type and the data length threshold, wherein the first interactive field, the second field, and the third interactive field are displayed simultaneously.

6. The method of claim 1, wherein accessing the external system comprises:

provisioning, by the computing device, an application programming interface for communication with the external system; and accessing, by the computing device, the external system via the application programming interface.

7. The method of claim 1, wherein the computing device and an additional computing device simultaneously access the tabular data file.

8. The method of claim 1, wherein the plurality of pixels is a first plurality of pixels, and wherein detecting the second information in the second field of the graphical user interface comprises, for the key-value pair:

detecting, by the computing device, the first plurality of pixels that represent the key in the second field of the graphical user interface;

until the value that corresponds to the key is detected:

selecting, by the computing device, a second plurality of pixels in the second field of the graphical user interface using a vector that points from a centroid of the first plurality of pixels to a centroid of the second plurality of pixels; and responsive to determining that the second plurality of pixels does not include the value, updating, by the computing device, at least one of a magnitude of the vector and a direction of the vector.

9. A computing device, comprising:

one or more memories; and one or more processors in communication with the one or more memories and configured to execute instructions stored in the one or more memories to perform:

accessing, by the computing device and from an external system, a graphical user interface comprising at least a first interactive field for receiving text and a second field for displaying text that is retrieved from a database; and until a data type matches a target data type for a set of entities, iteratively performing:

retrieving, by the computing device, first information from a tabular data file using an index that identifies a row in the tabular data file for a respective entity of the set of entities, wherein each row in the tabular data file corresponds to a single entity of the set of entities;

providing, by the computing device, the first information for the respective entity to the first interactive field of the graphical user interface;

instructing, by the computing device, the external system to retrieve second information for the respective entity in response to the first information by simulating input to the graphical user interface;

detecting, by the computing device, the second information in the second field of the graphical user interface by:

locating, using a plurality of pixels of the graphical user interface, a key of a key-value pair in the second field, wherein the plurality of pixels represent the key; and determining a value of the key-value pair based on a location of the key, wherein at least a portion of the second information is displayed in the graphical user interface as the value;

adding, by the computing device, the second information to the row in the tabular data file;

detecting, by the computing device, the data type for the second information;

comparing, by the computing device, the data type against the target data type; and determining, by the computing device, whether to update the index for a subsequent iteration based at least in part on the comparing.

10. The computing device of claim 9, wherein retrieving respective first information for a first entity and adding respective second information for a second entity are performed simultaneously.

11. The computing device of claim 9, wherein a data length is identified for the second information.

12. The computing device of claim 11, wherein the one or more memories store additional instructions that cause the one or more processors to perform:

comparing, by the computing device, the data length against a data length threshold.

13. The computing device of claim 12, wherein the graphical user interface further comprises a third interactive field for receiving the target data type and the data length threshold, wherein the first interactive field, the second field, and the third interactive field are displayed simultaneously.

14. The computing device of claim 9, wherein the one or more memories store additional instructions that cause the one or more processors to perform:

provisioning, by the computing device, an application programming interface for communication with the external system; and accessing, by the computing device, the external system via the application programming interface.

15. The computing device of claim 9, wherein the computing device and an additional computing device simultaneously access the tabular data file.

16. A non-transitory computer-readable medium storing a plurality of instructions that, when executed by one or more processors of a computing device, cause the one or more processors to perform:

accessing, by the computing device and from an external system, a graphical user interface comprising at least a first interactive field for receiving text and a second field for displaying text that is retrieved from a database; and until a data type matches a target data type for a set of entities, iteratively performing:

retrieving, by the computing device, first information from a tabular data file using an index that identifies a row in the tabular data file for a respective entity of the set of entities, wherein each row in the tabular data file corresponds to a single entity of the set of entities;

providing, by the computing device, the first information for the respective entity to the first interactive field of the graphical user interface;

instructing, by the computing device, the external system to retrieve second information for the respective entity in response to the first information by simulating input to the graphical user interface;

detecting, by the computing device, the second information in the second field of the graphical user interface by:

locating, using a plurality of pixels of the graphical user interface, a key of a key-value pair in the second field, wherein the plurality of pixels represent the key; and determining a value of the key-value pair based on a location of the key, wherein at least a portion of the second information is displayed in the graphical user interface as the value;

adding, by the computing device, the second information to the row in the tabular data file;

detecting, by the computing device, the data type for the second information;

comparing, by the computing device, the data type against the target data type; and determining, by the computing device, whether to update the index for a subsequent iteration based at least in part on the comparing.

17. The non-transitory computer-readable medium of claim 16, wherein retrieving respective first information for a first entity and adding respective second information for a second entity are performed simultaneously.

18. The non-transitory computer-readable medium of claim 16, wherein a data length is identified for the second information.

19. The non-transitory computer-readable medium of claim 18, wherein the non-transitory computer-readable medium stores additional instructions that cause the one or more processors to perform:

comparing, by the computing device, the data length against a data length threshold.

20. The non-transitory computer-readable medium of claim 16, wherein the non-transitory computer-readable medium stores additional instructions that cause the one or more processors to perform:

provisioning, by the computing device, an application programming interface for communication with the external system; and accessing, by the computing device, the external system via the application programming interface.

* * * * *